US012581244B2

(12) United States Patent
Kilian et al.

(10) Patent No.: US 12,581,244 B2
(45) Date of Patent: Mar. 17, 2026

(54) DATA TRANSMISSION BETWEEN A USER TERMINAL AND ANOTHER APPARATUS

(71) Applicant: Fraunhofer-Gesellschaft zur Förderung der angewandten Forschung e.V., Munich (DE)

(72) Inventors: Gerd Kilian, Erlangen (DE); Michael Schlicht, Erlangen (DE); Josef Bernhard, Erlangen (DE); Dominik Soller, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 247 days.

(21) Appl. No.: 17/181,492

(22) Filed: Feb. 22, 2021

(65) Prior Publication Data

US 2021/0175929 A1 Jun. 10, 2021

Related U.S. Application Data

(63) Continuation of application No. PCT/EP2019/073067, filed on Aug. 29, 2019.

(30) Foreign Application Priority Data

Aug. 30, 2018 (DE) .......................... 102018214716.7

(51) Int. Cl.
| | |
|---|---|
| *H04B 5/24* | (2024.01) |
| *H04R 9/06* | (2006.01) |
| *H04R 9/08* | (2006.01) |

(52) U.S. Cl.
CPC ................. *H04R 9/06* (2013.01); *H04B 5/24* (2024.01); *H04R 9/08* (2013.01); *H04R 2420/07* (2013.01)

(58) Field of Classification Search
CPC .. H04B 5/0031; H04B 5/0056; H04B 5/0075; H04R 9/06; H04R 9/08; H04R 2420/07; H04R 2499/11; H04R 1/028
(Continued)

(56) References Cited

U.S. PATENT DOCUMENTS

| | | |
|---|---|---|
| 2,381,097 A | 8/1945 | Adams |
| 3,098,220 A | 7/1963 | De Graaf |

(Continued)

FOREIGN PATENT DOCUMENTS

| | | |
|---|---|---|
| CA | 2791516 A1 | 4/2013 |
| CH | 365640 A | 11/1962 |

(Continued)

OTHER PUBLICATIONS

IEEE Standard Association, "IEEE Standard for Low-Rate Wireless Networks Amendment 2: Low Power Wide Area Network (NPWAN) Extension to the Low-Energy Critical Infrastructure Monitoring (LECIM) Physical Layer (PHY)", IEEE Computer Society, Jun. 4, 2020, pp. 1-44.
(Continued)

*Primary Examiner* — Eugene Yun
(74) *Attorney, Agent, or Firm* — NKL LAW; Jae Youn Kim

(57) ABSTRACT

Embodiments provide a method for transmitting data between a user terminal and another apparatus. The method has a step of generating a signal for driving an electromagnetic oscillating circuit connected to the user terminal. Additionally, the method has a step of driving the electromagnetic oscillating circuit by the generated signal to produce, by the electromagnetic oscillating circuit, a magnetic field which carries data to be transmitted from the user terminal to the other apparatus.

31 Claims, 9 Drawing Sheets

100

(58) Field of Classification Search
USPC ....................................................... 455/41.1
See application file for complete search history.

(56) References Cited

U.S. PATENT DOCUMENTS

| | | | |
|---|---|---|---|
| 3,764,746 A | 10/1973 | Libby | |
| 4,415,769 A | 11/1983 | Gray | |
| 5,684,837 A | 11/1997 | Chen | |
| 5,887,176 A | 3/1999 | Griffith et al. | |
| 6,593,845 B1 | 7/2003 | Friedman et al. | |
| 6,636,146 B1 | 10/2003 | Wehoski | |
| 6,870,475 B2 | 3/2005 | Fitch et al. | |
| 7,254,366 B2 | 8/2007 | Palermo et al. | |
| 7,307,521 B2 | 12/2007 | Funk et al. | |
| 7,574,173 B2 | 8/2009 | Palermo et al. | |
| 7,750,435 B2 | 7/2010 | Rofougaran | |
| 7,808,389 B2 | 10/2010 | Finkenzeller | |
| 7,831,205 B2 | 11/2010 | Jack et al. | |
| 7,903,041 B2 | 3/2011 | Levan | |
| 8,174,360 B2 | 5/2012 | Finkenzeller | |
| 8,188,854 B2 | 5/2012 | Yamashita | |
| 8,190,086 B2 | 5/2012 | Fukaishi et al. | |
| 8,240,562 B2 | 8/2012 | Washiro | |
| 8,254,990 B2 | 8/2012 | Hawker et al. | |
| 8,413,895 B2 | 4/2013 | Nakatsugawa et al. | |
| 8,437,695 B2 | 5/2013 | Chatterjee et al. | |
| 8,532,570 B2 | 9/2013 | Fukami et al. | |
| 8,538,332 B2 | 9/2013 | Borrett et al. | |
| 8,611,817 B2 | 12/2013 | Kalanithi | |
| 8,643,473 B2 | 2/2014 | Suzuki et al. | |
| 8,675,908 B2 | 3/2014 | Muenter et al. | |
| 8,711,656 B1 | 4/2014 | Paulson | |
| 8,744,520 B2 | 6/2014 | Maeda | |
| 8,909,162 B2 | 12/2014 | Bakalski et al. | |
| 8,915,428 B1 | 12/2014 | Post | |
| 9,001,881 B2 | 4/2015 | Keisuke et al. | |
| 9,022,285 B2 | 5/2015 | Graylin | |
| 9,048,884 B2 | 6/2015 | Levan | |
| 9,065,488 B2 | 6/2015 | Sung et al. | |
| 9,071,289 B2 | 6/2015 | Mcfarthing | |
| 9,142,997 B2 | 9/2015 | Tack et al. | |
| 9,160,417 B2 | 10/2015 | Tack et al. | |
| 9,166,439 B2 | 10/2015 | Jatupum et al. | |
| 9,167,377 B2 | 10/2015 | Clarke | |
| 9,225,568 B1 | 12/2015 | Mei et al. | |
| 9,240,827 B2 | 1/2016 | Brockenbrough et al. | |
| 9,287,735 B2 | 3/2016 | Sung et al. | |
| 9,306,626 B2 | 4/2016 | Brand et al. | |
| 9,379,784 B2 | 6/2016 | Dhayni | |
| 9,401,768 B2 | 7/2016 | Backman et al. | |
| 9,413,432 B2 | 8/2016 | Cho et al. | |
| 9,455,771 B2 | 9/2016 | Dobyns | |
| 9,608,327 B1 | 3/2017 | Lai et al. | |
| 9,673,866 B2 | 6/2017 | Ikeda | |
| 9,716,967 B2 | 7/2017 | Takeuchi | |
| 9,787,364 B2 | 10/2017 | Moore et al. | |
| 9,793,961 B2 | 10/2017 | Charrat | |
| 9,812,254 B2 | 11/2017 | Wakabayashi | |
| 9,831,924 B2 | 11/2017 | Lin | |
| 9,846,796 B2 | 12/2017 | Rezayee | |
| 9,859,950 B2 | 1/2018 | Jianbin et al. | |
| 9,872,109 B2 | 1/2018 | Miller et al. | |
| 9,893,570 B2 | 2/2018 | Beyer et al. | |
| 9,894,468 B2 | 2/2018 | Brown et al. | |
| 9,912,174 B2 | 3/2018 | Soar | |
| 9,965,411 B2 | 5/2018 | Hall | |
| 10,009,069 B2 | 6/2018 | Liesbeth et al. | |
| 10,038,476 B2 | 7/2018 | Sung et al. | |
| 10,039,084 B2 | 7/2018 | Bernhard et al. | |
| 10,050,677 B1 | 8/2018 | Thoen | |
| 10,074,837 B2 | 9/2018 | Kilbourne et al. | |
| 10,177,900 B2 | 1/2019 | Michel et al. | |
| 10,263,470 B2 | 4/2019 | Ettes et al. | |
| 10,270,168 B2 | 4/2019 | Kanno | |
| 10,332,676 B2 | 6/2019 | Amer et al. | |
| 10,360,485 B2 | 7/2019 | Fan et al. | |
| 10,367,265 B2 | 7/2019 | Batra et al. | |
| 10,430,701 B2 | 10/2019 | Cho et al. | |
| 10,439,449 B2 | 10/2019 | Alonso et al. | |
| 10,461,812 B2 | 10/2019 | Qingbin et al. | |
| 10,476,553 B2 | 11/2019 | Letian et al. | |
| 10,511,349 B2 | 12/2019 | Kahlman | |
| 10,574,297 B2 | 2/2020 | Moore et al. | |
| 10,593,470 B1 | 3/2020 | Lekas et al. | |
| 10,630,073 B2 | 4/2020 | Taya | |
| 10,666,325 B2 | 5/2020 | Qingbin et al. | |
| 10,715,935 B2 | 7/2020 | Andersen et al. | |
| 10,720,964 B2 | 7/2020 | Kahlman et al. | |
| 10,811,913 B2 | 10/2020 | Berdnikov et al. | |
| 11,050,299 B2 | 6/2021 | Kanto et al. | |
| 11,757,490 B2 | 9/2023 | Killian et al. | |
| 2005/0237160 A1 | 10/2005 | Nolan et al. | |
| 2007/0060221 A1 | 3/2007 | Burgan et al. | |
| 2008/0173717 A1 | 7/2008 | Antebi et al. | |
| 2009/0060243 A1 | 3/2009 | Michaelis | |
| 2009/0219137 A1 | 9/2009 | Forster | |
| 2010/0081379 A1 | 4/2010 | Cooper et al. | |
| 2011/0031928 A1 | 2/2011 | Soar | |
| 2011/0050164 A1 | 3/2011 | Partovi et al. | |
| 2011/0076979 A1* | 3/2011 | Wu | H01L 23/5225 |
| | | | 336/84 R |
| 2011/0140852 A1 | 6/2011 | Wuidart | |
| 2011/0300801 A1 | 12/2011 | Kerselaers et al. | |
| 2011/0309687 A1 | 12/2011 | Bohori et al. | |
| 2012/0007442 A1 | 1/2012 | Hyland et al. | |
| 2012/0071089 A1 | 3/2012 | Charrat et al. | |
| 2012/0252391 A1 | 10/2012 | Kanno | |
| 2013/0094680 A1 | 4/2013 | Allen et al. | |
| 2013/0119774 A1 | 5/2013 | Ichikawa | |
| 2013/0127259 A1 | 5/2013 | Lohr et al. | |
| 2013/0143486 A1 | 6/2013 | Zhu et al. | |
| 2013/0147281 A1 | 6/2013 | Kamata | |
| 2013/0217334 A1 | 8/2013 | Yu et al. | |
| 2013/0281016 A1 | 10/2013 | Mcfarthing | |
| 2013/0295845 A1 | 11/2013 | Maenpaa et al. | |
| 2014/0080412 A1 | 3/2014 | Hurt et al. | |
| 2014/0343703 A1 | 11/2014 | Venugopal et al. | |
| 2014/0369170 A1 | 12/2014 | Backman et al. | |
| 2015/0035374 A1 | 2/2015 | Park et al. | |
| 2015/0041534 A1 | 2/2015 | Center et al. | |
| 2015/0115735 A1 | 4/2015 | Singh et al. | |
| 2015/0155918 A1 | 6/2015 | Van Wageningen | |
| 2015/0349896 A1 | 12/2015 | Kartik et al. | |
| 2016/0049800 A1 | 2/2016 | Tanaka et al. | |
| 2016/0057542 A1 | 2/2016 | Pasek et al. | |
| 2016/0124573 A1* | 5/2016 | Rouaissia | H03K 17/955 |
| | | | 345/174 |
| 2016/0156387 A1 | 6/2016 | Ota | |
| 2016/0276877 A1 | 9/2016 | Weale | |
| 2017/0041715 A1 | 2/2017 | Jumani et al. | |
| 2017/0070080 A1 | 3/2017 | Kang et al. | |
| 2017/0117879 A1 | 4/2017 | Chakraborty et al. | |
| 2017/0118714 A1 | 4/2017 | Kaechi | |
| 2017/0141604 A1 | 5/2017 | Park et al. | |
| 2017/0187245 A1 | 6/2017 | Uchida | |
| 2017/0188129 A1* | 6/2017 | Sindia | H03G 3/3005 |
| 2017/0213831 A1 | 7/2017 | Nakai | |
| 2017/0256989 A1 | 9/2017 | Yoshii | |
| 2017/0289671 A1 | 10/2017 | Patel et al. | |
| 2017/0352951 A1 | 12/2017 | Lee | |
| 2018/0083670 A1 | 3/2018 | Kenichi et al. | |
| 2018/0108994 A1 | 4/2018 | Lee | |
| 2018/0132019 A1* | 5/2018 | Riedel | H04R 1/02 |
| 2018/0143223 A1 | 5/2018 | Taya | |
| 2018/0181952 A1 | 6/2018 | Enriquez et al. | |
| 2018/0187447 A1* | 7/2018 | Gharabegian | F21V 23/0464 |
| 2018/0287669 A1 | 10/2018 | Nakano et al. | |
| 2018/0324915 A1* | 11/2018 | Luccato | H02M 3/33553 |
| 2018/0364310 A1 | 12/2018 | Taya | |
| 2019/0036347 A1 | 1/2019 | Arasaki et al. | |
| 2019/0208336 A1* | 7/2019 | Andersen | H04R 25/558 |
| 2020/0019955 A1 | 1/2020 | Cho et al. | |
| 2020/0076474 A1 | 3/2020 | Daga et al. | |
| 2020/0143611 A1 | 5/2020 | Choi et al. | |

(56) References Cited

U.S. PATENT DOCUMENTS

| | | | |
|---|---|---|---|
| 2020/0169299 A1 | 5/2020 | Fermon et al. | |
| 2020/0274404 A1 | 8/2020 | Sankar | |
| 2021/0152216 A1 | 5/2021 | Kilian et al. | |
| 2021/0175929 A1 | 6/2021 | Kilian et al. | |
| 2022/0060218 A1 | 2/2022 | Kneißl et al. | |

FOREIGN PATENT DOCUMENTS

| | | | |
|---|---|---|---|
| CN | 1967940 A | 5/2007 | |
| CN | 101900613 B | 12/2010 | |
| CN | 202617115 U | 12/2012 | |
| CN | 203014937 U | 6/2013 | |
| CN | 103187999 A | 7/2013 | |
| CN | 103825661 A | 5/2014 | |
| CN | 102957454 B | 12/2014 | |
| CN | 204442353 U | 7/2015 | |
| CN | 103187998 B | 8/2015 | |
| CN | 103187993 B | 11/2015 | |
| CN | 105591675 A | 5/2016 | |
| CN | 103187984 B | 9/2016 | |
| CN | 106019955 A | 10/2016 | |
| CN | 106233802 A | 12/2016 | |
| CN | 104158305 B | 1/2017 | |
| CN | 106452510 A | 2/2017 | |
| CN | 206302413 U | 7/2017 | |
| CN | 107102724 A | 8/2017 | |
| CN | 107154682 A | 9/2017 | |
| CN | 107437961 A | 12/2017 | |
| CN | 108259069 A | 7/2018 | |
| CN | 109586768 A | 4/2019 | |
| CN | 107852548 B | 4/2020 | |
| CN | 111092636 A | 5/2020 | |
| DE | 102011115092 A1 | 4/2013 | |
| DE | 102011082098 B4 | 4/2014 | |
| DE | 102013227141 A1 | 6/2015 | |
| DE | 20 2017 102 047 U1 | 7/2017 | |
| DE | 102018212957 B3 | 1/2020 | |
| DE | 102018214716 A1 | 3/2020 | |
| DE | 102019201152 B3 | 6/2020 | |
| DE | 102019206848 B3 | 8/2020 | |
| EP | 0901670 A1 | 3/1999 | |
| EP | 1250026 A1 | 10/2002 | |
| EP | 0901670 B1 | 7/2004 | |
| EP | 1654813 A1 | 5/2006 | |
| EP | 1688016 A1 | 8/2006 | |
| EP | 1688016 B1 | 9/2007 | |
| EP | 1654813 B1 | 11/2007 | |
| EP | 1869842 A1 | 12/2007 | |
| EP | 1981176 A1 | 10/2008 | |
| EP | 2023661 A1 | 2/2009 | |
| EP | 2119029 A1 | 11/2009 | |
| EP | 2159929 A2 | 3/2010 | |
| EP | 2211579 A1 | 7/2010 | |
| EP | 2338238 B1 | 6/2011 | |
| EP | 2347522 A1 | 7/2011 | |
| EP | 2367294 A1 | 9/2011 | |
| EP | 2579554 A1 | 4/2013 | |
| EP | 2625653 A2 | 8/2013 | |
| EP | 2688078 A1 | 1/2014 | |
| EP | 2740223 A1 | 6/2014 | |
| EP | 2773087 A1 | 9/2014 | |
| EP | 2777128 A2 | 9/2014 | |
| EP | 2625653 B1 | 11/2014 | |
| EP | 2347522 B1 | 12/2014 | |
| EP | 2119029 B1 | 4/2015 | |
| EP | 3022823 A1 | 5/2016 | |
| EP | 3161933 A1 | 5/2017 | |
| EP | 3168953 A1 | 5/2017 | |
| EP | 3312808 A1 | 4/2018 | |
| EP | 1869842 B1 | 1/2019 | |
| EP | 3427391 A1 | 1/2019 | |
| EP | 3480918 A1 | 5/2019 | |
| EP | 3427391 B1 | 11/2019 | |
| GB | 2441051 A | 2/2008 | |
| GB | 2444799 A | 6/2008 | |
| JP | H06104957 A | 4/1994 | |
| JP | 2003152606 A | 5/2003 | |
| JP | 2006121339 A | 5/2006 | |
| JP | 2007006123 A | 1/2007 | |
| JP | 2010284066 A | 12/2010 | |
| JP | 5034850 B2 | 9/2012 | |
| JP | 5431033 B2 | 3/2014 | |
| JP | 5456625 B2 | 4/2014 | |
| JP | 2016192761 A | 11/2016 | |
| JP | 6139732 B2 | 5/2017 | |
| KR | 20050033764 A | 4/2005 | |
| KR | 20110001743 U | 2/2011 | |
| KR | 20150114063 A | 10/2015 | |
| KR | 20160040484 A | 4/2016 | |
| KR | 20160102786 A | 8/2016 | |
| KR | 20160122615 A | 10/2016 | |
| KR | 101763030 B1 | 7/2017 | |
| KR | 101797563 B1 | 11/2017 | |
| KR | 101870877 B1 | 6/2018 | |
| RU | 2566792 C1 | 10/2015 | |
| TW | I281340 B | 5/2007 | |
| TW | 201328226 A1 | 7/2013 | |
| WO | 9501678 A1 | 1/1995 | |
| WO | 2007/135434 A1 | 11/2007 | |
| WO | 2008/071924 A2 | 6/2008 | |
| WO | 2013/006954 A1 | 1/2013 | |
| WO | 2013022207 A1 | 2/2013 | |
| WO | 2013097670 A1 | 7/2013 | |
| WO | 2014205201 A1 | 12/2014 | |
| WO | 2015/096930 A1 | 7/2015 | |
| WO | 2015/101120 A1 | 7/2015 | |
| WO | 2016/037045 A1 | 3/2016 | |
| WO | 2016/076736 A1 | 5/2016 | |
| WO | 2016076498 A1 | 5/2016 | |
| WO | 2016/153589 A2 | 9/2016 | |
| WO | 2016/154762 A1 | 10/2016 | |
| WO | 2016/202284 A1 | 12/2016 | |
| WO | 2017/036864 A1 | 3/2017 | |
| WO | 2017/138789 A1 | 8/2017 | |
| WO | 2017/144387 A1 | 8/2017 | |
| WO | 2019172610 A1 | 9/2019 | |
| WO | 2020/004940 A1 | 1/2020 | |
| WO | 2020/025450 A1 | 2/2020 | |
| WO | 2020/043814 A1 | 3/2020 | |
| WO | 2020157098 A1 | 8/2020 | |
| WO | 2020/229309 A2 | 11/2020 | |

OTHER PUBLICATIONS

Sonal Verma et al., "AudioDAQ", Embedded Network Sensor Systems, ACM, 2 Penn Plaza, Suite 701 New York NY 10121-0701 USA, Nov. 6, 2012 (Nov. 6, 2012), pp. 197-210, XP058029972, DOI: 10.1145/2426656.2426677 ISBN: 978-1-4503-1169-4.
"File: GMSK PSD.png", https://en.wikipedia.org/wiki/Minimum-shift_keying#/media/File:GMSK_PSD.png, zuletzt geöffnet: Apr. 15, 2019, Wikipedia.
ETSI TS 103 357, "Short Range Devices; Low Throughput Networks (LTN); Protocols for radio interface A", V1.1.1 (2018-16), Jun. 2018, France.
NEC Data Sheet Junction Field Effect Transistor 2SK3230, "N-Channel Silicon Junction Field Effect Transistor for Impedance Converters of ECM", Document No. D15942EJ1DODS00, 1st Edition, Jan. 2002.
L. Salzburger, https://fahrplan.events.ccc.de/camp/2015/Fahrplan/system/attachments/2671/original/Mythen_der_Elektronikentwicklung_v2.pdf.
R. Kollmann et al., "Fallstricke beim Einsatz von MLCCs", https://www.analog-praxis.de/fallstricke-beim-einsatz-von-mlccs-a-535573/, Aug. 27, 2015.
Digi-Key Electronics, "Protecting Inputs in Digital Electronics", https://www.digikey.com/en/articles/techzone/2012/apr/protecting-inputs-in-digital-electronics, Apr. 11, 2012.
"Spule (Elektrotechnik)",https://de.wikipedia.org/w/index.php?title=Spule_(Elektrotechnik)&oldid=200834434, Jun. 10, 2020, Wikipedia.
"SMD-Ferrit", https://de.wikipedia.org/w/index,php?title=Ferrit&oldid=157277430, Aug. 22, 2016, Wikipedia.

(56) References Cited

OTHER PUBLICATIONS

Microchip Technology Inc., "microIDTM 125 kHz RFID System Design Guide", Dec. 1998.

Stefan Sieben, "Office Action for PCT Patent Application No. PCT/EP2021/067848", Jun. 15, 2022, EPO, Germany.

Trigona, "Haus und Wohnung: Telefon-Mithorverstarker", http://www.trigonal.de/sel/huw_09.htm, Jul. 13, 2008, 2 pages.

Office Action in parallel U.S. Appl. No. 17/454,321 issued on Dec. 30, 2024.

* cited by examiner

100

Generating a signal for driving an electromagnetic
oscillating circuit connected to the user terminal

~102

Driving the electromagnetic oscillating circuit
by the generated signal to produce,
by the electromagnetic oscillating circuit,
a magnetic field which carries data to be transmitted
from the user terminal to the other apparatus

~104

200

Detecting, by an electromagnetic oscillating
circuit connected to the user terminal,
a magnetic field produced by the other apparatus
to receive data which the magnetic field
of the other apparatus carries    ∼202

Evaluating a signal provided by the electromagnetic
oscillating circuit responsive to detecting
the magnetic field to receive the second data    ∼204

300

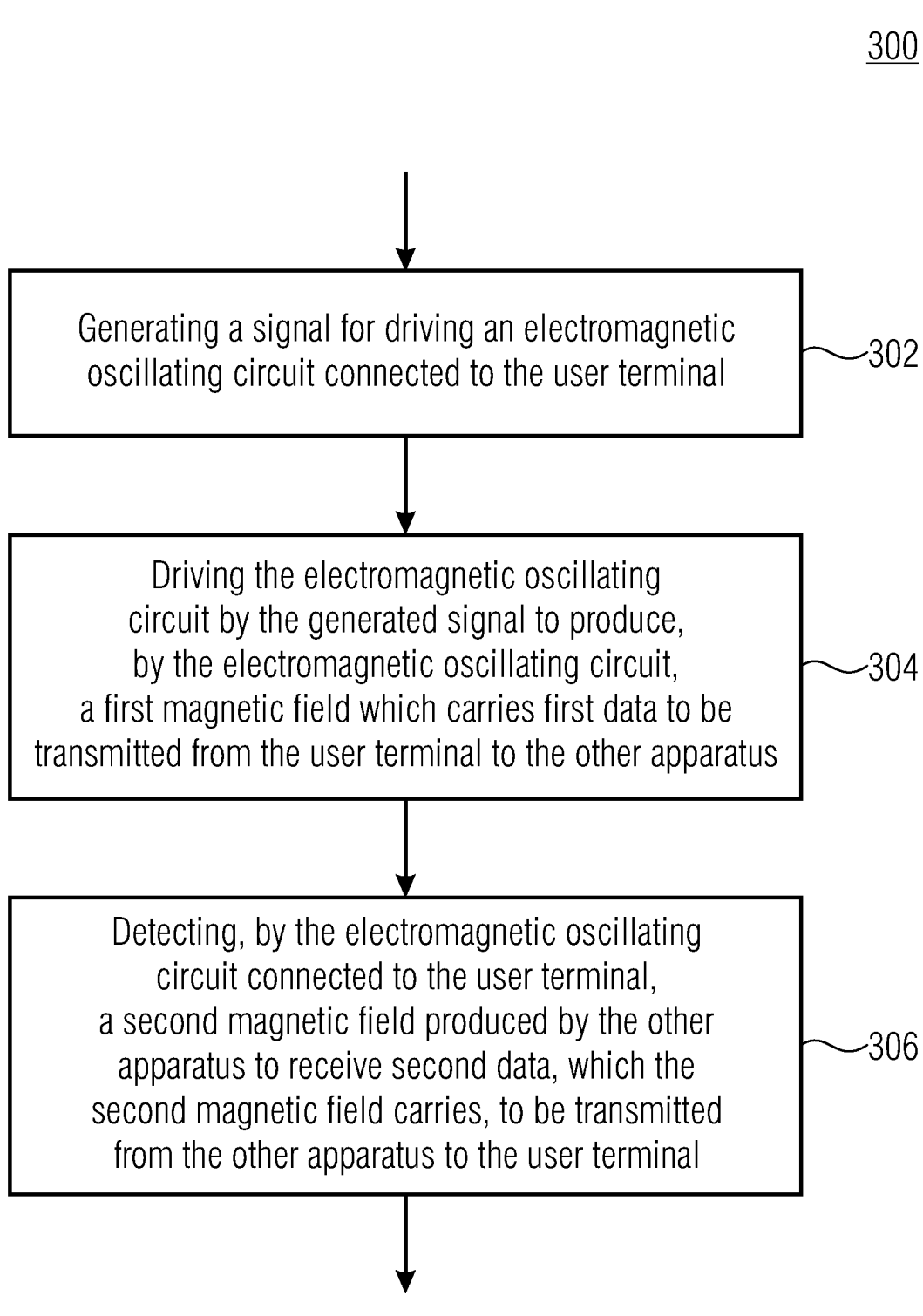

Generating a signal for driving an electromagnetic
oscillating circuit connected to the user terminal          302

Driving the electromagnetic oscillating
circuit by the generated signal to produce,
by the electromagnetic oscillating circuit,
a first magnetic field which carries first data to be
transmitted from the user terminal to the other apparatus          304

Detecting, by the electromagnetic oscillating
circuit connected to the user terminal,
a second magnetic field produced by the other
apparatus to receive second data, which the
second magnetic field carries, to be transmitted
from the other apparatus to the user terminal          306

Generating a signal for driving an electromagnetic
oscillating circuit of the base station    402

Driving the electromagnetic oscillating circuit of
the base station by the generated signal to produce,
by the electromagnetic oscillating circuit,
a magnetic field which carries data to be transmitted
from the base station to the other apparatus    404

DATA TRANSMISSION BETWEEN A USER TERMINAL AND ANOTHER APPARATUS

CROSS-REFERENCE TO RELATED APPLICATIONS

This application is a continuation of copending International Application No. PCT/EP2019/073067, filed Aug. 29, 2019, which is incorporated herein by reference in its entirety, and additionally claims priority from German Application No. 102018214716.7, filed Aug. 30, 2018, which is also incorporated herein by reference in its entirety.

BACKGROUND OF THE INVENTION

Embodiments of the present invention relate to a method for transmitting data between a user terminal and another apparatus. Further embodiments relate to a user terminal, another apparatus and a system comprising a user terminal and another apparatus. Some embodiments relate to a bidirectional configuration of a sensor node by a mobile phone.

Conventionally, user-configurable apparatuses, like IoT nodes (like sensor nodes), for example, or WLAN cameras, are configured via a wired connection. However, several electric contacts are entailed in this case both at the apparatus to be configured and the user terminal, like a mobile phone, employed for configuring the apparatus.

Alternatively, user-configurable apparatuses can be configured via a radio connection. However, dedicated transmission/reception elements are used here.

Furthermore, user-configurable apparatuses can be configured via an optical connection. However, both visual contact and dedicated optical components are used here.

Additionally, user-configurable apparatuses can be configured via an acoustic connection, as is, for example, usually done in smoke detectors. However, using an acoustic connection entails a microphone in the apparatus.

Additionally, user-configurable devices can be configured by means of magnetic coupling. Usually, NFC (near field communication) is employed here, which, however, means additional NFC elements in the apparatus. To aggravate the situation, not all user terminals support NFC. Currently available iPhones®, for example, are only able to read, but not write using NFC.

Furthermore, making use of the magnetic effect of loudspeakers is known. Thus, U.S. Pat. No. 2,381,079 A describes a so-called telephone listening amplifier which makes use of the magnetic effect of loudspeakers. Here, the magnetic field of a loudspeaker is received, amplified and converted to an acoustic signal by another loudspeaker.

U.S. Pat. No. 4,415,769 A describes an apparatus allowing transmitting and receiving signals via a telephone line to at least one inductive element of the telephone apparatus by electromagnetic coupling.

U.S. Pat. No. 3,764,746 A describes a data coupler for coupling a data terminal to a telephone network with no direct conducting connection. Here, data signals from an induction coil are electromagnetically coupled into a loudspeaker of a telephone receiver.

Consequently, the object underlying the present invention is providing a concept which allows a cheap configuration of an apparatus easy to be performed by a user.

SUMMARY

According to an embodiment, a method for transmitting data between a user terminal and another apparatus may have the steps of: generating a signal for driving an electromagnetic oscillating circuit connected to the user terminal, driving the electromagnetic oscillating circuit by the generated signal to produce, by the electromagnetic oscillating circuit, a magnetic field which carries data to be transmitted from the user terminal to the other apparatus; wherein the generated signal is generated by an audio signal generator of the user terminal; or wherein the generated signal is generated by an audio signal generator connected to the user terminal; wherein the data are configuration data for configuring the other apparatus; detecting the magnetic field by an electromagnetic oscillating circuit of the other apparatus to receive the data; configuring the other apparatus based on the received data; wherein the data are first data, wherein the magnetic field is a first magnetic field, the method further having the steps of: producing a second magnetic field by the electromagnetic oscillating circuit of the other apparatus, the second magnetic field carrying second data to be transmitted from the other apparatus to the user terminal, and detecting the second magnetic field by the electromagnetic oscillating circuit connected to the user terminal to receive the second data.

According to another embodiment, a method for bidirectionally transmitting data between a user terminal and another apparatus may have the steps of: generating a signal for driving an electromagnetic oscillating circuit connected to the user terminal, driving the electromagnetic oscillating circuit by the generated signal to produce, by the electromagnetic oscillating circuit, a first magnetic field which carries first data to be transmitted from the user terminal to the other apparatus, detecting, by the electromagnetic oscillating circuit connected to the user terminal, a second magnetic field produced by the other apparatus to receive second data, which the second magnetic field carries, to be transmitted from the other apparatus to the user terminal, wherein the electromagnetic oscillating circuit is connected to the user terminal via a bidirectional audio interface of the user terminal, or wherein the electromagnetic oscillating circuit is connected via a bidirectional audio interface of a wireless audio adapter connected to the user terminal.

Another embodiment may have a user terminal, wherein the user terminal is connected to an audio signal generator, wherein the user terminal is configured to drive the audio signal generator to generate a signal for driving an electromagnetic oscillating circuit, and to drive the electromagnetic oscillating circuit by the generated signal to produce, by the electromagnetic oscillating circuit, a first magnetic field which carries first data to be transmitted from the user terminal to the other apparatus; wherein the user terminal is connected to an audio signal detector and configured to detect, by means of the audio signal detector, a second magnetic field produced by the other apparatus, by the electromagnetic oscillating circuit, and to receive second data, which the second magnetic field carries, to be transmitted from the other apparatus to the user terminal.

Another embodiment may have a system having: an inventive user terminal as mentioned above, and another apparatus, the other apparatus having an electromagnetic oscillating circuit configured to detect the first magnetic field which carries the first data.

According to another embodiment, an apparatus may have: a microcontroller, an electromagnetic oscillating circuit for detecting a first magnetic field and for producing a second magnetic field, wherein the microcontroller is configured to evaluate the first magnetic field detected by the electromagnetic oscillating circuit to receive first data which the first magnetic field carries, wherein the microcontroller is configured to generate a signal for driving the electromagnetic oscillating circuit, and to drive the electromagnetic oscillating circuit by the generated signal to produce the second magnetic field by the electromagnetic oscillating circuit, the second magnetic field carrying second data, wherein the electromagnetic oscillating circuit is connected directly to comparator inputs/outputs of the microcontroller of the apparatus.

According to still another embodiment, a method for transmitting data between a base station and another apparatus may have the steps of: generating a signal for driving an electromagnetic oscillating circuit of the base station, and driving the electromagnetic oscillating circuit of the base station by the generated signal to produce, by the electromagnetic oscillating circuit, a magnetic field which carries data to be transmitted from the base station to the other apparatus; wherein the data are configuration data for configuring the other apparatus; detecting the magnetic field by an electromagnetic oscillating circuit of the other apparatus to receive the data; configuring the other apparatus based on the received data.

According to another embodiment, a method for bidirectionally transmitting data between a base station and another apparatus may have the steps of: generating a signal for driving an electromagnetic oscillating circuit of the base station, driving the electromagnetic oscillating circuit by the generated signal to produce, by the electromagnetic oscillating circuit, a first magnetic field which carries first data to be transmitted from the base station to the other apparatus, detecting, by the electromagnetic oscillating circuit of the base station, a second magnetic field produced by the other apparatus to receive second data, which the second magnetic field carries, to be transmitted from the other apparatus to the base station.

Another embodiment may have a base station, wherein the base station has a signal generator, the signal generator being configured to generate a signal for driving an electromagnetic oscillating circuit, and to drive the electromagnetic oscillating circuit by the generated signal to produce, by the electromagnetic oscillating circuit, a first magnetic field which carries first data to be transmitted from the base station to the other apparatus; wherein the base station has a signal detector, the signal detector being configured to detect, by the electromagnetic oscillating circuit, a second magnetic field produced by the other apparatus to receive second data, which the second magnetic field carries, to be transmitted from the other apparatus to the base station.

According to another embodiment, a system may have: an inventive base station as mentioned above, and another apparatus, wherein the other apparatus has an electromagnetic oscillating circuit configured to detect the first magnetic field which carries the first data.

Embodiments provide a method for transmitting data between a user terminal and another apparatus. The method comprises a step of generating a signal for driving an electromagnetic oscillating circuit connected to the user terminal. In addition, the method comprises a step of driving the electromagnetic oscillating circuit by the generated signal to produce, by the electromagnetic oscillating circuit, a magnetic field which carries data to be transmitted from the user terminal to the other apparatus.

The present invention is based on the idea of using an electromagnetic oscillating circuit which is connected to the user terminal via an audio interface (for example of the user terminal or a wireless audio adapter wirelessly connected to the user terminal) to produce a magnetic field which carries the data (like configuration data for configuring the other apparatus, for example) to be transmitted to the other apparatus (like an IoT node or a WLAN camera). This offers the advantage that every standard user terminal, like mobile phone or tablet computer, for example, can be used. A cheap electromagnetic oscillating circuit which can be realized, for example, by means of an LC oscillating circuit and thus is cheaper by a multiple than conventionally used components, like dedicated radio elements, optical components, acoustic sensors or NFC modules, can be used in the other apparatus for detecting the magnetic field which carries the data. Optionally, the other apparatus can, for a bidirectional connection between the user terminal and the other apparatus, be configured to produce, by means of its electromagnetic oscillating circuit, a second magnetic field, which carries second data to be transmitted from the other apparatus to the user terminal, wherein the user terminal can detect the second magnetic field by means of its electromagnetic oscillating circuit to receive the second data.

In embodiments, the generated signal can be generated by an audio signal generator of the user terminal.

In embodiments, the generated signal can be generated by an audio signal generator connected to the user terminal.

In embodiments, the generated signal can be in the frequency range between 10 Hz and 22 kHz.

In embodiments, the data can be modulated onto the generated signal.

In embodiments, the data can be configuration data for configuring the other apparatus.

In embodiments, the electromagnetic oscillating circuit can be connected to the user terminal via an audio interface of the user terminal.

In embodiments, the electromagnetic oscillating circuit can be connected via an audio interface of a wireless audio adapter connected to the user terminal.

In embodiments, the audio interface can be a wired audio interface.

In embodiments, the wired audio interface can be a jack, an USB-C audio port or a Lightning audio port.

In embodiments, the wireless audio adapter can be a Bluetooth, WLAN or Certified Wireless USB audio adapter.

In embodiments, the electromagnetic oscillating circuit can be an LC oscillating circuit.

In embodiments, the user terminal can be a mobile phone or tablet computer.

In embodiments, the method can additionally comprise a step of detecting the magnetic field by an electromagnetic oscillating circuit of the other apparatus to receive the data.

In embodiments, the method can additionally comprise a step of configuring the other apparatus based on the received data.

In embodiments, the step of configuring the other apparatus can comprise a step of connecting the other apparatus to a communication network using the received data.

In embodiments, the steps of detecting and configuring can be performed by the other apparatus.

In embodiments, the other apparatus can be an IoT node or a WLAN camera.

In embodiments, the IoT node can be a sensor node or actuator node.

In embodiments, the data can be first data and the magnetic field can be a first magnetic field, wherein the method can additionally comprise a step of producing a second magnetic field by the electromagnetic oscillating circuit of the other apparatus, wherein the second magnetic field carries second data to be transmitted from the other apparatus to the user terminal, and wherein the method can additionally comprise a step of detecting the second magnetic field by the electromagnetic oscillating circuit connected to the user terminal to receive the second data.

In embodiments, the method can additionally comprise a step of evaluating a signal provided by the electromagnetic oscillating circuit responsive to detecting the second magnetic field to receive the second data.

In embodiments, the signal provided by the electromagnetic oscillating circuit can be evaluated by the user terminal.

In embodiments, the step of producing the second magnetic field can comprise a step of generating a second signal for driving the electromagnetic oscillating circuit of the other apparatus, and a step of driving the electromagnetic oscillating circuit of the other apparatus by the generated second signal to produce, by the electromagnetic oscillating circuit of the other apparatus, the second magnetic field which carries the second data.

Further embodiments provide a method for transmitting data between a user terminal and another apparatus. The method comprises a step of detecting a magnetic field produced by the other apparatus, by an electromagnetic oscillating circuit connected to the user terminal to receive data which the magnetic field of the other apparatus carries. Additionally, the method comprises a step of evaluating a signal provided by the electromagnetic oscillating circuit response to detecting the magnetic field to receive the second data.

Further embodiments provide a method for bidirectionally transmitting data between a user terminal and another apparatus. The method comprises a step of generating a signal for driving an electromagnetic oscillating circuit connected to the user terminal. Additionally, the method comprises a step of driving the electromagnetic oscillating circuit by the generated signal to produce, by the electromagnetic oscillating circuit, a first magnetic field which carries first data to be transmitted from the user terminal to the other apparatus. Additionally, the method comprises a step of detecting a second magnetic field produced by the other apparatus by the electromagnetic oscillating circuit connected to the user terminal to receive second data, which the second magnetic field carries, to be transmitted from the other apparatus to the user terminal.

In embodiments, the method can additionally comprise a step of evaluating a signal provided by the electromagnetic oscillating circuit (126) responsive to detecting the second magnetic field (132) to receive the second data.

In embodiments, the electromagnetic oscillating circuit can be connected to the user terminal via a bidirectional audio interface of the user terminal.

In embodiments, the electromagnetic oscillating circuit can be connected via a bidirectional audio interface of a wireless audio adapter connected to the user terminal.

In embodiments, the method can additionally comprise a step of detecting the first magnetic field by an electromagnetic oscillating circuit of the other apparatus to receive the first data.

In embodiments, the method can further comprise a step of producing the second magnetic field by the electromagnetic oscillating circuit of the other apparatus, wherein the second magnetic field carries the second data to be transmitted from the other apparatus to the user terminal.

Further embodiments provide a user terminal, the user terminal being connected to a signal generator, the user terminal being configured to drive the signal generator to generate a signal for driving an electromagnetic oscillating circuit, and to drive the electromagnetic oscillating circuit by the generated signal to produce, by the electromagnetic oscillating circuit, a first magnetic field which carries first data to be transmitted from the user terminal to the other apparatus.

In embodiments, the user terminal can comprise the audio signal generator.

In embodiments, the user terminal can be connected to a wireless audio adapter which comprises the audio signal generator.

In embodiments, the user terminal can be connected to an audio signal detector and can be configured to detect, by means of the audio signal detector, a second magnetic field produced by the other apparatus, by the electromagnetic oscillating circuit to receive second data, which the second magnetic field carries, to be transmitted from the other apparatus to the user terminal.

In embodiments, the user terminal can comprise the audio signal detector.

In embodiments, the user terminal can be connected to a wireless audio adapter which comprises the audio signal detector.

In embodiments, the electromagnetic oscillating circuit can be connected to the user terminal via an audio interface of the user terminal.

In embodiments, the electromagnetic oscillating circuit can be connected via an audio interface of a wireless audio adapter connected to the user terminal.

In embodiments, the audio interface can be a wired audio interface.

In embodiments, the wired audio interface can be a jack, an USB-C audio port or a Lightning audio port.

In embodiments, the wireless audio adapter can be a Bluetooth, WLAN or Certified Wireless USB audio adapter.

In embodiments, the electromagnetic oscillating circuit can be an LC oscillating circuit.

Further embodiments provide a system comprising a user terminal in accordance with any of the embodiments described above, and another apparatus, the other apparatus comprising an electromagnetic oscillating circuit configured to detect the first magnetic field, which carries the first data.

In embodiments, the other apparatus can comprise a microcontroller configured to evaluate the detected first magnetic field to receive the first data.

In embodiments, the microcontroller of the other apparatus can be configured to produce, by the electromagnetic oscillating circuit of the other apparatus, a second magnetic field, which carries second data to be transmitted from the other apparatus to the user terminal.

In embodiments, the electromagnetic oscillating circuit of the other apparatus can be connected directly to comparator inputs/outputs of the microcontroller of the other apparatus.

In embodiments, the microcontroller of the other apparatus can be configured to put the comparator inputs/outputs to a defined level to detect the first magnetic field by the electromagnetic oscillating circuit of the other apparatus.

In embodiments, the microcontroller of the other apparatus can be configured to generate a signal for driving the electromagnetic oscillating circuit of the other apparatus, and to drive the electromagnetic oscillating circuit of the other apparatus by the generated signal to produce, by the electromagnetic oscillating circuit of the other apparatus, the second magnetic field, which carries the second data.

Further embodiments provide an apparatus comprising a microcontroller, an electromagnetic oscillating circuit for detecting a first magnetic field and for producing a second magnetic field, the microcontroller being configured to evaluate the first magnetic field detected by the electromagnetic oscillating circuit to receive first data which the first magnetic field carries, the microcontroller being configured to generate a signal for driving the electromagnetic oscillating circuit, and to drive the electromagnetic oscillating circuit by the generated signal to produce the second magnetic field by the electromagnetic oscillating circuit, the second magnetic field carrying second data, wherein the electromagnetic oscillating circuit is connected directly to comparator inputs/outputs of the microcontroller of the apparatus.

Further embodiments provide a method for transmitting data between a base station and another apparatus. The method comprises a step of generating a signal for driving an electromagnetic oscillating circuit of the base station. The method additionally comprises a step of driving the electromagnetic oscillating circuit of the base station by the generated signal to produce, by the electromagnetic oscillating circuit, a magnetic field which carries data to be transmitted from the base station to the other apparatus.

In embodiments, the generated signal can be in the frequency range between 10 Hz and 22 kHz.

In embodiments, the data can be modulated onto the generated signal (124).

In embodiments, the data can be configuration data for configuring the other apparatus.

In embodiments, the method can additionally comprise a step of detecting the magnetic field by an electromagnetic oscillating circuit of the other apparatus to receive the data.

In embodiments, the method can additionally comprise a step of configuring the other apparatus based on the received data.

In embodiments, the step of configuring the other apparatus can comprise a step of connecting the other apparatus to a communication network using the received data.

In embodiments, the data can be first data and the magnetic field can be a first magnetic field, wherein the method can further comprise a step of producing a second magnetic field by the electromagnetic oscillating circuit of the other apparatus, wherein the second magnetic field carries second data to be transmitted from the other apparatus to the base station, and a step of detecting the second magnetic field by the electromagnetic oscillating circuit of the base station to receive the second data.

Further embodiments provide a method for bidirectionally transmitting data between a base station and another apparatus. The method comprises a step of generating a signal for driving an electromagnetic oscillating circuit of the base station. Additionally, the method comprises a step of driving the electromagnetic oscillating circuit by the generated signal to produce, by the electromagnetic oscillating circuit, a first magnetic field, which carries first data to be transmitted from the base station to the other apparatus. In addition, the method comprises a step of detecting, by the electromagnetic oscillating circuit of the base station, a second magnetic field produced by the other apparatus to receive second data, which the second magnetic field carries, to be transmitted from the other apparatus to the base station.

Further embodiments provide a base station, the base station comprising a signal generator, the signal generator being configured to generate a signal for driving an electromagnetic oscillating circuit, and to drive the electromagnetic oscillating circuit by the generated signal to produce, by the electromagnetic oscillating circuit, a first magnetic field which carries first data to be transmitted from the base station to the other apparatus.

In embodiments, the base station can comprise a signal detector, the signal detector being configured to detect a second magnetic field produced by the other apparatus, by the electromagnetic oscillating circuit to receive second data, which the second magnetic field carries, to be transmitted from the other apparatus to the base station.

Further embodiments provide a system comprising a base station in accordance with any of the embodiments described above, and another apparatus, the other apparatus comprising an electromagnetic oscillating circuit configured to detect the first magnetic field which carries the first data.

In embodiments, the other apparatus can comprise a microcontroller configured to evaluate the detected first magnetic field (130) to receive the first data.

In embodiments, the microcontroller of the other apparatus can be configured to produce, by the electromagnetic oscillating circuit of the other apparatus, a second magnetic field, which carries second data to be transmitted from the other apparatus to the base station.

BRIEF DESCRIPTION OF THE DRAWINGS

Embodiments of the present invention will be described below in greater detail referring to the appended drawings, in which:

FIG. 5 is a flowchart of a method for bidirectionally transmitting data between a user terminal and another apparatus, in accordance with an embodiment;

DETAILED DESCRIPTION OF THE INVENTION

Figure 1:
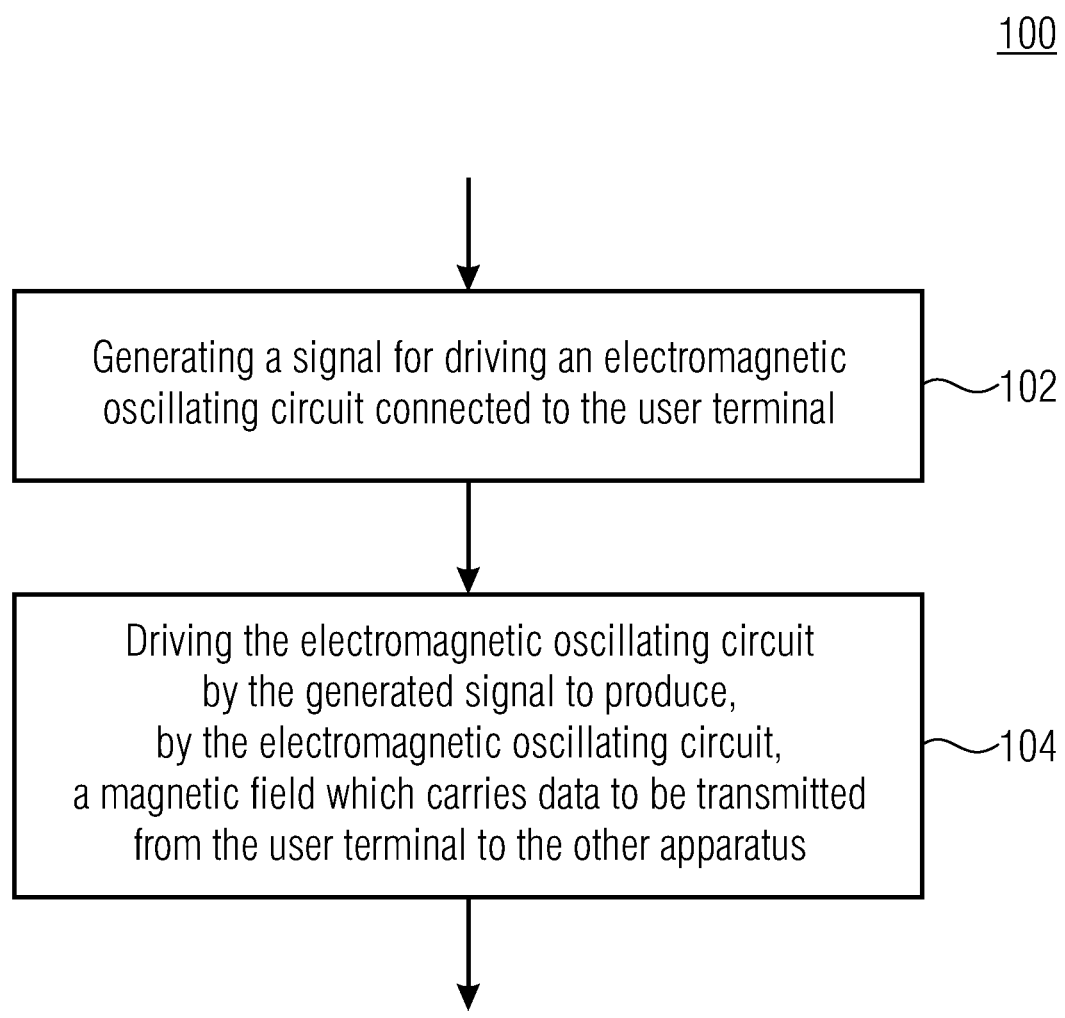
FIG. 1 is a flow chart of a method for transmitting data between a user terminal and another apparatus, in accordance with an embodiment.

In the following description of the embodiments of the present invention, equal elements or elements of equal effect, in the figures, are provided with equal reference numerals so that the description thereof is mutually interchangeable.

FIG. 1 shows a flowchart of a method 100 for transmitting data between a user terminal and another apparatus. The method 100 comprises a step 102 of generating a signal for driving an electromagnetic oscillating circuit connected to the user terminal. Additionally, the method 100 comprises a step 104 of driving the electromagnetic oscillating circuit by the generated signal to produce, by the electromagnetic oscillating circuit, a magnetic field which carries data to be transmitted from the user terminal to the other apparatus.

Embodiments of the method 100 for transmitting data between a user terminal and another apparatus as shown in FIG. 1 will be discussed below in greater detail referring to FIGS. 2a to 2c.

Figure 2A:
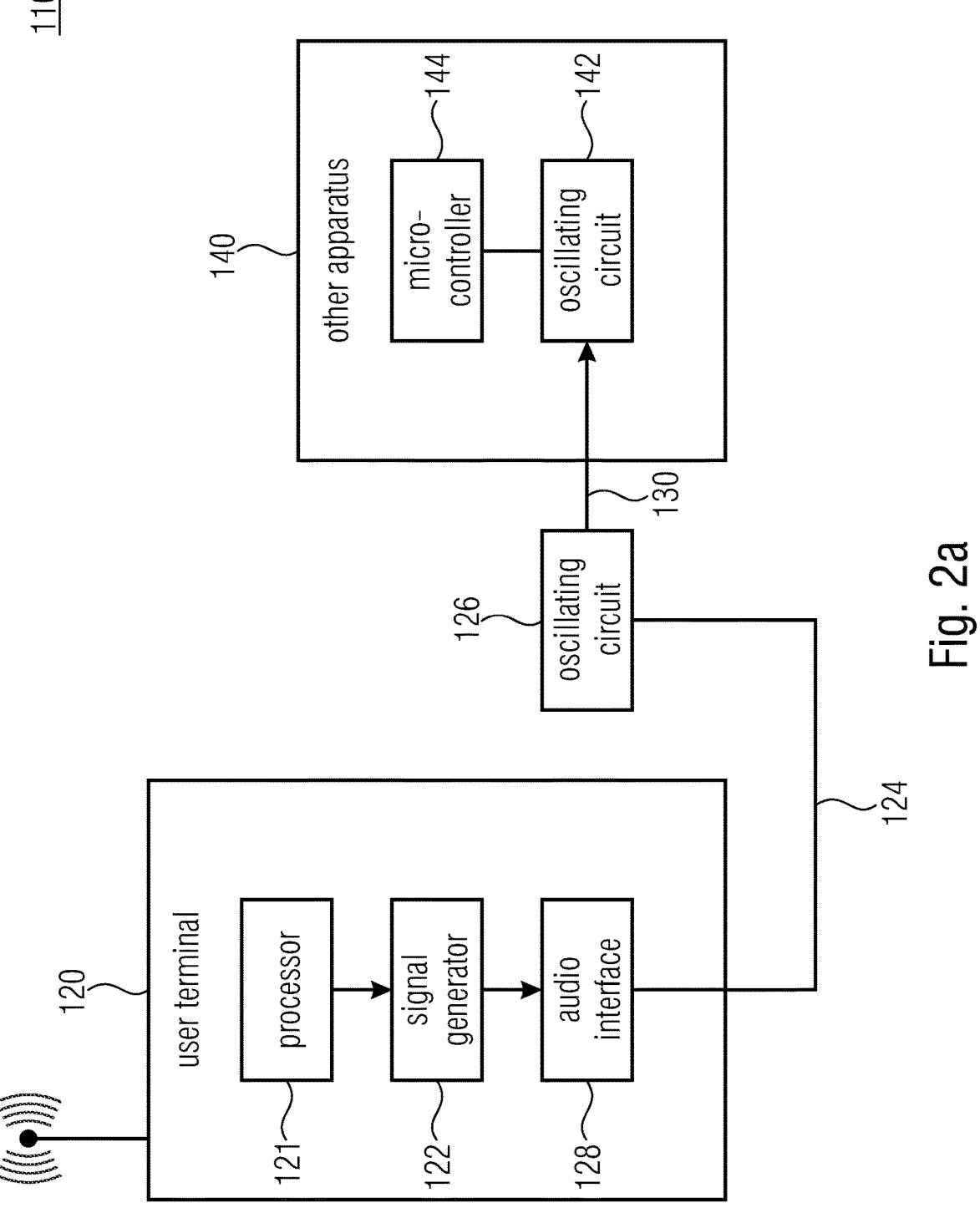
FIG. 2a shows a schematic block circuit diagram of a system comprising a user terminal and another apparatus, in accordance with an embodiment.

FIG. 2a shows a schematic block circuit diagram of a system 110 comprising a user terminal 120 and another apparatus 140, in accordance with an embodiment.

The user terminal 120 comprises a signal generator 122, the user terminal 120 (or a processor 121 of the user terminal 120, for example) being configured to drive the signal generator 122 to generate a signal 124 for driving an electromagnetic oscillating circuit 124, and to drive the electromagnetic oscillating circuit 126 by the generated signal 124 to produce, by the electromagnetic oscillating circuit 126, a first magnetic field 130 which carries first data to be transmitted from the user terminal 120 to the other apparatus 140.

In embodiments, the signal generator 122 can be an audio signal generator. Conventionally, such an audio signal generator 122 is configured to generate an audio signal for driving an audio reproduction apparatus (like headsets) connected to the user terminal 120, wherein, in embodiments, instead of an audio reproduction apparatus, the electromagnetic oscillating circuit 126 is driven by the signal 124 generated by the audio signal generator 122 to generate the magnetic field 130 which carries the data. The audio signal generator 122 can, for example, be an amplifier.

In embodiments, the electromagnetic oscillating circuit 126 can be connected to the signal generator 122 via an audio interface 128. The audio interface 128 can, for example, be a wired audio interface, like a jack, an USB-C® audio port or Lightning® audio port.

In the embodiment shown in FIG. 2a, the user terminal 120 comprises the signal generator 122. Alternatively, the signal generator 122 can also be implemented externally of the user terminal 120. Exemplarily, the signal generator 122 can be implemented in a wireless audio adapter connected to the user terminal 120, as is shown in FIG. 2b.

Figure 2B:
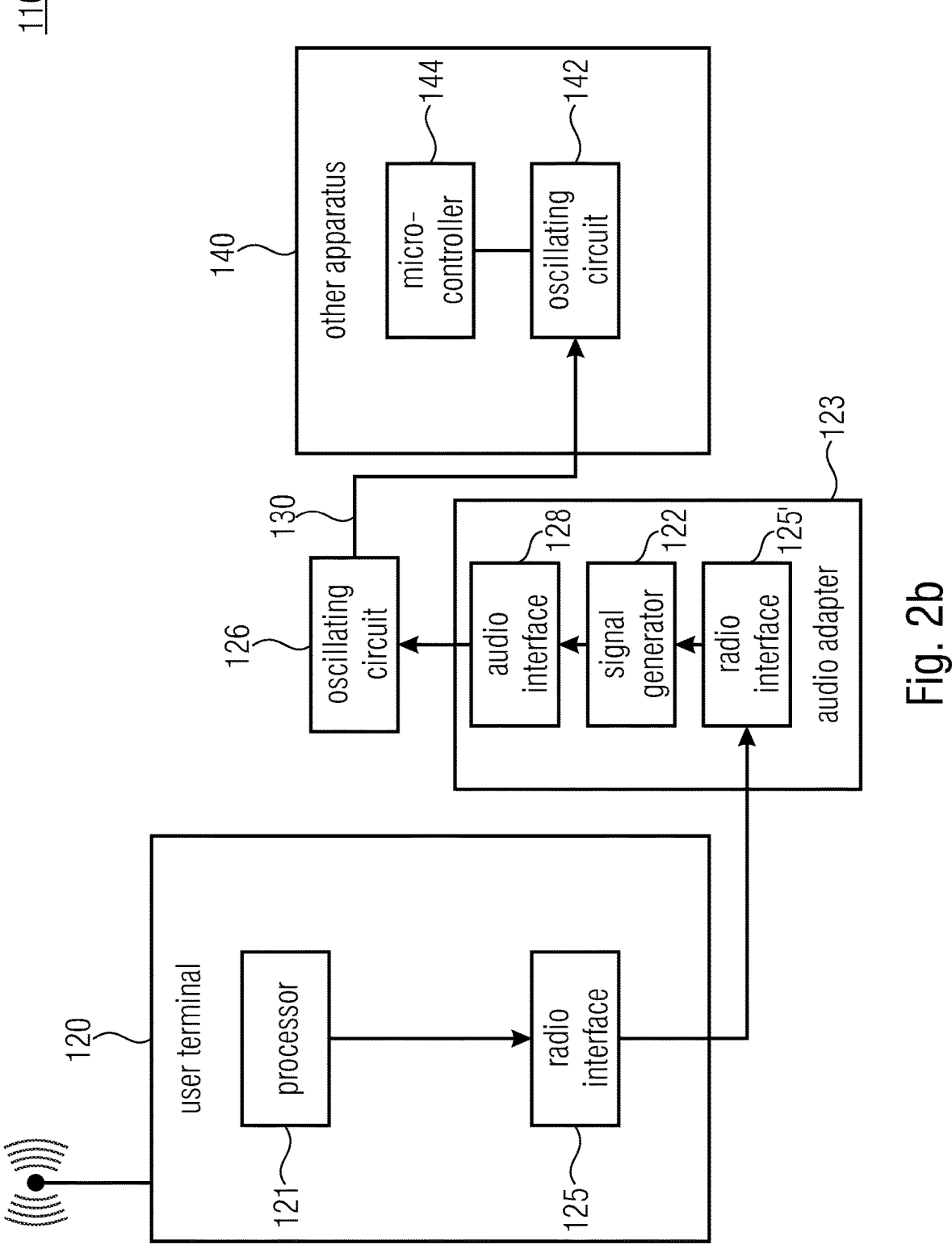
FIG. 2b shows a schematic block circuit diagram of a system comprising a user terminal and another apparatus, in accordance with an embodiment.

In detail, FIG. 2b shows a schematic block circuit diagram of a system 100 comprising a user terminal 120 and another apparatus 140, wherein the user terminal 120 is connected to a wireless audio adapter 123 which comprises the signal generator 122, wirelessly (like via corresponding radio interfaces 125, 125' (like Bluetooth, WLAN, Certified Wireless USB)).

As can be recognized from FIG. 2b, in this case, the electromagnetic oscillating circuit 126 can be connected the signal generator 122 via an audio interface 128 of the wireless audio adapter 123. The audio interface 128 can be a wired audio interface, like a jack, an USB-C® audio port or a Lightning® audio port, for example.

The wireless audio adapter 123 can, for example, be a Bluetooth, WLAN or Certified Wireless USB audio adapter.

Further embodiments of the present invention will be described below, which can be applied both to embodiments in which the user terminal 120 comprises a signal generator 122, and to embodiments in which a wireless audio adapter 123 connected to the user terminal comprises the signal generator 122.

In embodiments, the generated signal can be in a frequency range between 10 Hz and 22 kHz.

In embodiments, the data can be modulated onto the generated signal 124, for example by means of FSK (frequency shift keying), MSK (minimum shift keying) or GMSK (Gaussian minimum shift keying).

Another type of modulation can of course also be used, like ASK (amplitude shift keying), PSK (phase shift keying)

or OOK (on-off keying, a type of amplitude shift keying where the carrier is switched on and off).

In embodiments, the ratio between carrier frequency and modulation bandwidth of the generated signal can be smaller than 25% (or exemplarily smaller than 20% or smaller than 15%).

In embodiments, the electromagnetic oscillating circuit can be an LC oscillating circuit.

In embodiments, the user terminal 120 can be a mobile phone (smart phone) or tablet computer.

As can be recognized from FIGS. 2a and 2b, the other apparatus 140 comprises an electromagnetic oscillating circuit 142 configured to detect the magnetic field 130 which carries the data. Additionally, the other apparatus 140 comprises a microcontroller 144 configured to evaluate the detected magnetic field 130 to receive the data.

In embodiments, the data which the magnetic field 130 carries can be configuration data. The microcontroller 144 can be configured to configure the other apparatus 140 based on the configuration data, like include the same in a wireless network, for example.

Exemplarily the other apparatus 140 can be a user-configurable apparatus, like an IoT (internet of things) node (like a sensor node or actuator node) or a WLAN camera, for example. In this case, the configuration data can comprise information for connecting the user-configurable apparatus 140 to a wireless network (like sensor network or WLAN, for example), like a network name and network key, for example. Of course, other parameters, like a frequency channel to be used, time slots to be used or a hopping pattern to be used, can be associated to the user-configurable apparatus 140 by the configuration data.

The arrangement shown in FIGS. 2a and 2b can also be used for bidirectionally transmitting data between the user terminal 120 and the other apparatus 140, as will be discussed below referring the embodiment shown in FIG. 2c.

Figure 2C:
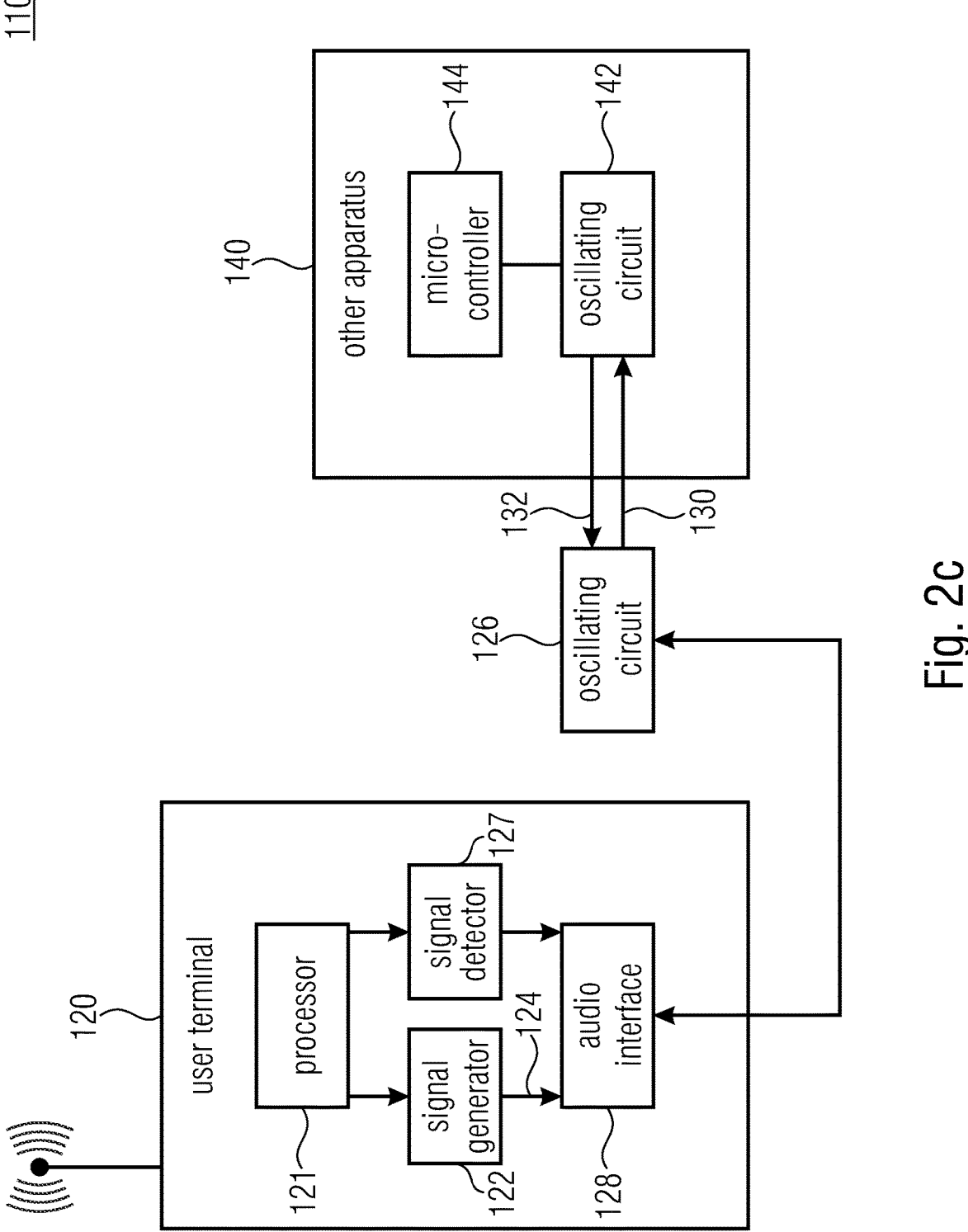
FIG. 2c shows a schematic block circuit diagram of a system comprising a user terminal and another apparatus, in accordance with another embodiment.

In detail, FIG. 2c shows a schematic block circuit diagram of a system 110 comprising a user terminal 120 and another apparatus 140, in accordance with an embodiment.

The user terminal 122 (or the processor 121 of the user terminal 122) can be configured to generate a signal 124 for driving the electromagnetic oscillating circuit 126 connected to the user terminal 120 by means of the signal generator 122, and to drive the electromagnetic oscillating circuit 126 by the generated signal to produce, by the electromagnetic oscillating circuit 126, a first magnetic field 130 which carries first data to be transmitted from the user terminal 120 to the other apparatus 140.

Additionally, the user terminal 122 (or the processor 121 of the user terminal 122) can be configured to detect, by means of a signal detector 127, a signal provided by the electromagnetic oscillating circuit 126 responsive to the second magnetic field 132 to receive second data, which the second magnetic field 130 carries, to be transmitted from the other apparatus 140 to the user terminal 120.

In embodiments, the user terminal 122 can additionally be configured to evaluate the detected signal to receive the second data.

In embodiments, the user terminal 122 can comprise both the signal generator 122 and the signal detector 127. The electromagnetic oscillating circuit 126 can thus be connected to the signal generator 122 and the signal detector 127 via the bidirectional audio interface 128 (for example audio output and audio input (microphone input)). The bidirectional audio interface 128 can be a wired audio interface, like a jack, an USB-C® audio port or Lightning® audio port.

In analogy to FIG. 2b, it is of course also possible for both the signal generator 122 and the signal detector 127 to be implemented externally of the user terminal 120. Thus, the wireless audio adapter (see FIG. 2b) can comprise the signal generator 122 and the signal detector 127, wherein the electromagnetic oscillating circuit 126 in this case is connected to the signal generator 122 and the signal detector 127 via the bidirectional audio interface of the wireless audio adapter. The bidirectional audio interface 128 can be a wired audio interface, like a jack, an USB-C® audio port or Lightning® audio port.

In embodiments, the microcontroller of the other apparatus 140 can be configured to produce, by the electromagnetic oscillating circuit 142 of the other apparatus 140, the second magnetic field 132 which carries the second data to be transmitted from the other apparatus 140 to the user terminal 120.

Exemplarily, the microcontroller 144 of the other apparatus 140 can be configured to generate a signal for driving the electromagnetic oscillating circuit 142 of the other apparatus 140, and to drive the electromagnetic oscillating circuit 142 of the other apparatus 140 by the generated signal to produce the second magnetic field 132, which carries the second data, by the electromagnetic oscillating circuit 142 of the other apparatus 140.

Embodiments of the present invention thus provide a cheap and generally available method of configuring and reading out apparatuses, above all sensor nodes. In embodiments, only one or two oscillating circuits each are connected both on the mobile phone side and the sensor node side.

Nowadays, mobile phones are generally widespread as user terminals 120. Combined microphone/loudspeaker connectors are, for example, incorporated in these mobile phones. The mobile phone 120 comprises an input and output amplifier having at least one input, one output and one ground connection.

In order to output an audio signal, the audio signal in the mobile phone 120 is passed to the amplifier 122 which in turn passes this signal 124 as an amplified signal to the audio interface 128, for example, an audio connector. If, instead of a loudspeaker or headset, an oscillating circuit 126 is connected to the audio interface 128, this oscillating circuit 126 produces a magnetic field 130 the temporal course of which is determined by the audio signal 124. Sensor nodes 140 can be configured cheaply and in an energy-efficient manner by detecting or receiving this magnetic field 130 by a simple oscillating circuit 142 (for example, only one single coil and one capacitor).

If an oscillating circuit 126 is connected to the microphone input instead of a microphone, it can detect a time-variable magnetic field 132. This allows a bidirectional connection to the sensor node 140 which, apart from configuring, also allows reading out parameters and confirming the configuration and a bidirectional key exchange.

Detailed embodiments of the present invention will be described below in greater detail.

1. Connecting an Oscillating Circuit to a Loudspeaker Output/Microphone Input of the User Terminal (in Combination and Individually)

In embodiments, an app (or application software) can be used on the user terminal 120 (like a mobile phone) to drive the audio output (for example loudspeaker output) (by means of the signal generator 122, for example). A magnetic field 130 can be produced by an oscillating circuit 126 inserted at the audio output. The other apparatus 140 (like IoT node, like sensor node or actuator node, for example)

can be provided with a magnetic detector 142. Thus, it is, for example, possible to configure the other apparatus using the user terminal.

In embodiments, the audio output (loudspeaker output, for example) of a user terminal 120 (like mobile phone, for example) can be made use of to drive the oscillating circuit 126.

In embodiments, the magnetic field 130 can be received by a magnetic detector (like LC oscillating circuit, for example) of the other apparatus 140 (like sensor node).

In embodiments, the data can be used for configuration in the other apparatus 140 (like sensor node, for example).

The embodiments described herein have the following advantages. User terminals are generally available (everybody has a mobile phone). Additionally, only a cheap magnetic detector (like only one coil and only one capacitor, for example) has to be provided on the side of the other apparatus. Additionally, the method is interference-proof (no sound). Additionally, the method is interception-proof since it works only over short distances (a few centimeters) (proximity to the other apparatus to be ensured). Additionally, the other apparatus (like sensor node) can be sealed/encapsulated in an air-tight manner.

2. Using Only a Single Oscillating Circuit For Bidirectional Communication by Reconfiguring the Microcontroller In embodiments, the electromagnetic oscillating circuit 142 of the other apparatus 140 can be connected directly to comparator inputs/outputs of the microcontroller 144 of the other apparatus 142.

In embodiments, the oscillating circuit 142 can be an LC oscillating circuit connected directly to a comparator input and an output of the microcontroller 144.

In embodiments, the microcontroller 144 of the other apparatus 140 can be configured to put the comparator inputs to a defined level to detect the first magnetic field 130 by the electromagnetic oscillating circuit 142 of the other apparatus 140.

In embodiments, the microcontroller output can be put to a defined level for receiving.

In embodiments, the microcontroller 142 of the other apparatus 140 can be configured to generate a signal for driving the electromagnetic oscillating circuit 142 of the other apparatus 140, and to drive the electromagnetic oscillating circuit 142 of the other apparatus 140 by the generated signal to produce the second magnetic field 132, which carries the second data, by the electromagnetic oscillating circuit 142 of the other apparatus.

In embodiments, the comparator input can be switched to be an output for transmitting.

3. Intercommunication Via Bluetooth

In embodiments, the audio signal to/from/to/from the oscillating circuit can be transmitted via Bluetooth. Thus, a separate module can simply be provided where the oscillating circuit/the oscillating circuits is/are connected to a headset, for example.

4. Using an Extendable Stick

In embodiments, the oscillating circuit can be mounted to an (extendable) stick, wherein the connection to the user terminal 120 can be made by cable or Bluetooth.

5. Configuration Interface in the Base Station

The communication interface can also be integrated in a base station by means of an oscillating circuit. Thus, new participants can be configured directly by holding them to the corresponding base station for operating the same, as is shown in FIG. 3.

Figure 3:
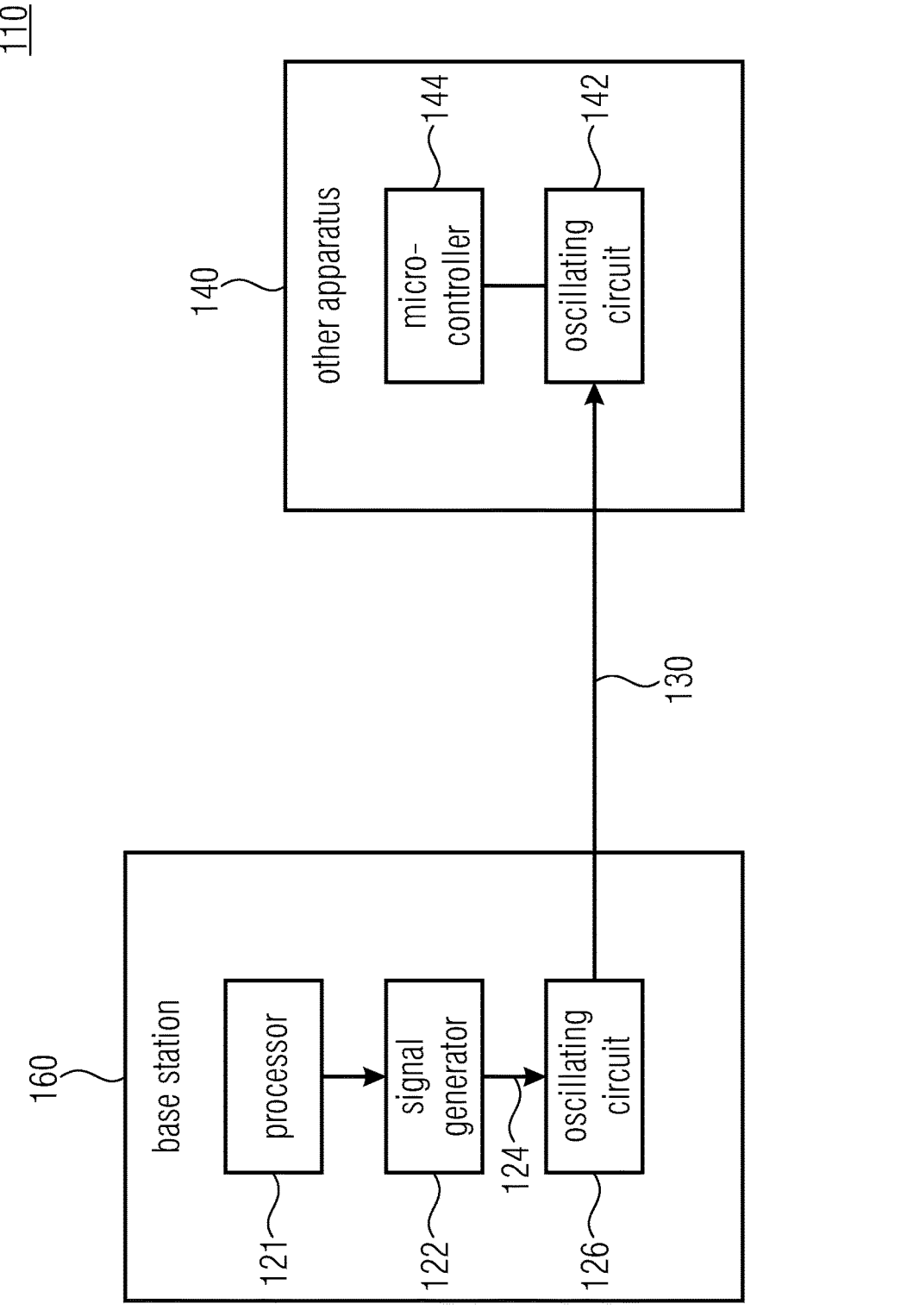
FIG. 3 shows a schematic block circuit diagram of a system comprising a base station and another apparatus, in accordance with an embodiment.

In detail, FIG. 3 shows a schematic block circuit diagram of a system comprising a base station 160 and another apparatus 140, in accordance with an embodiment.

The base station 160 comprises a signal generator 122, wherein the signal generator 120 (for example driven by the processor 121 of the base station 160) is configured to generate a signal 124 for driving an electromagnetic oscillating circuit 126 of the base station 160, and to drive the electromagnetic oscillating circuit 126 by the generated signal 124 to produce, by the electromagnetic oscillating circuit 126, a first magnetic field 130 which carries first data to be transmitted from the base station to the other apparatus 140.

In embodiments, the generated signal can be in the frequency range between 10 Hz and 22 kHz.

In embodiments, the data can be modulated onto the generated signal 124, for example by means of FSK (frequency shift keying), MSK (minimum shift keying), or GMSK (Gaussian minimum shift keying). A different type of modulation can of course also be used, like ASK (amplitude shift keying), PSK (phase shift keying) or OOK (on-off keying, a type of amplitude shift keying where the carrier is switched on and off).

In embodiments, the ratio between carrier frequency and modulation bandwidth of the generated signal can be smaller than 25% (or smaller than 20% or smaller than 15%, for example).

In embodiments, the electromagnetic oscillating circuit can be an LC oscillating circuit.

The other apparatus 140 can comprise an electromagnetic oscillating circuit 142 configured to detect the magnetic field 130 which carries the data. Additionally, the other apparatus 140 comprises a microcontroller 144 configured to evaluate the detected magnetic field 130 to receive the data.

In embodiments, the data which the magnetic field 130 carries can be configuration data. The microcontroller 144 can be configured to configure, for example, incorporate in a wireless network, the other apparatus 140 based on the configuration data.

Exemplarily, the other apparatus 140 can be a user-configurable apparatus, like an IoT (internet of things) node (like a sensor node or actuator node, for example) or a WLAN camera. In this case, the configuration data can comprise information for integrating the user-configurable apparatus 140 in a wireless network (like sensor network or WLAN, for example), like a network name and network key, for example. Of course, other parameters, like a frequency channel to be used, time slots to be used or a hopping pattern to be used, can be associated to the user-configurable apparatus 140 by the configuration data.

In embodiments, the base station (in analogy to the embodiment shown in FIG. 2c, for example) can comprise a signal detector, the signal detector (for example driven by the processor 121 of the base station 160) being configured to detect a signal provided by the electromagnetic oscillating circuit 126 responsive to a second magnetic field to receive second data, which the second magnetic field carries, to be transmitted from the other apparatus 140 to the base station 160.

6. Further Embodiments

Figure 4:
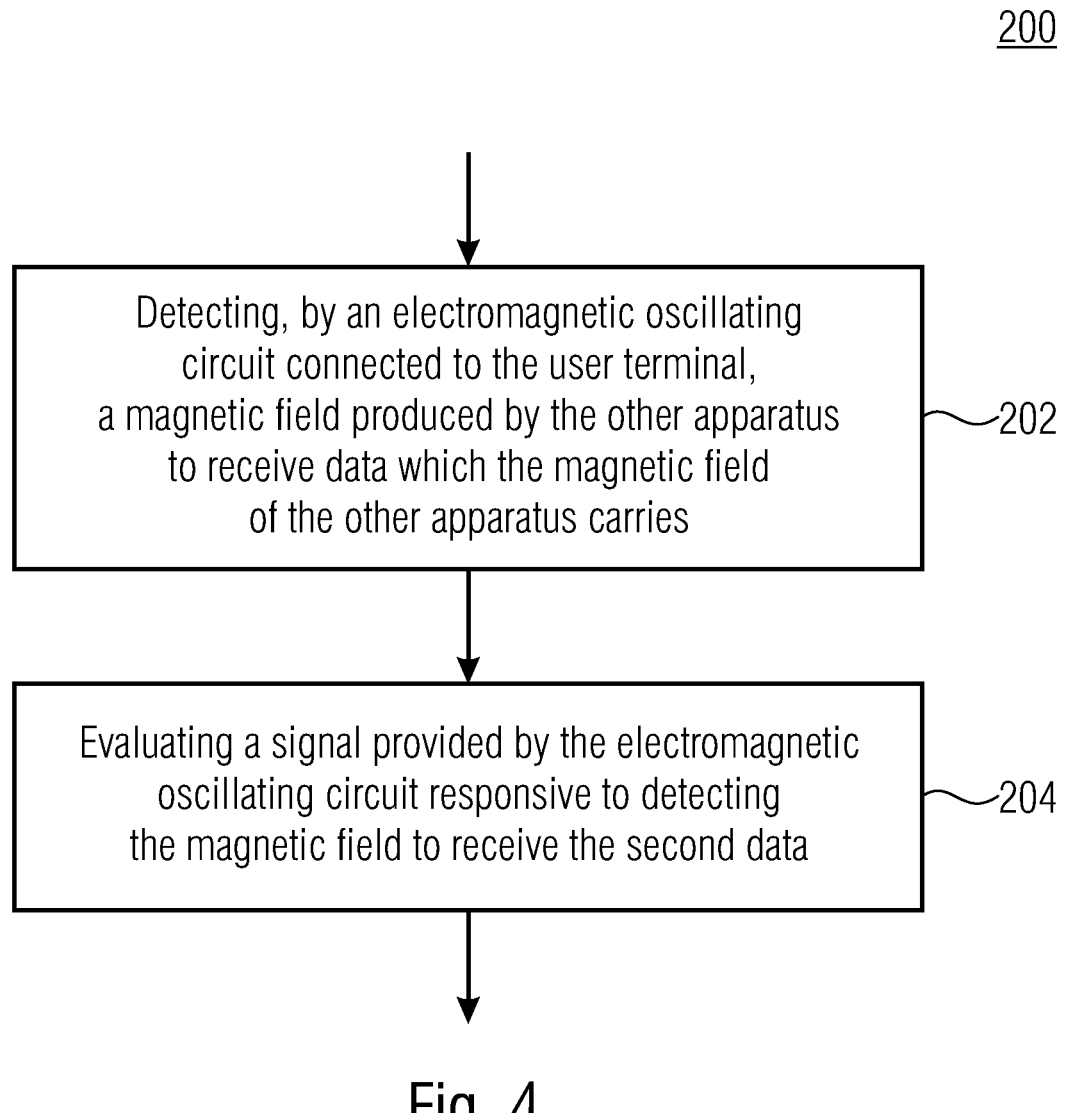
FIG. 4 is a flowchart of a method for transmitting data between a user terminal and another apparatus, in accordance with an embodiment.

FIG. 4 shows a flow chart of a method 200 for transmitting data between a user terminal and another apparatus. The method 200 comprises a step 202 of detecting, by an electromagnetic oscillating circuit connected to the user terminal, a magnetic field produced by the other apparatus to receive data which the magnetic field of the other apparatus carries. Additionally, the method 200 comprises a step 204 of evaluating a signal provided by the electromagnetic oscillating circuit responsive to detecting the magnetic field to receive the second data.

FIG. 5 shows a flowchart of a method 300 for bidirectionally transmitting data between a user terminal and another apparatus. The method 300 comprises a step 302 of generating a signal for driving an electromagnetic oscillating circuit connected to the user terminal. Additionally, the method 300 comprises a step 304 of driving the electromagnetic oscillating circuit by the generated signal to produce, by the electromagnetic oscillating circuit, a first magnetic field which carries first data to be transmitted from the user terminal to the other apparatus. Additionally, the method 300 comprises a step 306 of detecting, by the electromagnetic oscillating circuit connected to the user terminal, a second magnetic field produced by the other apparatus to receive second data, which the second magnetic field carries, to be transmitted from the other apparatus to the user terminal.

Figure 6:
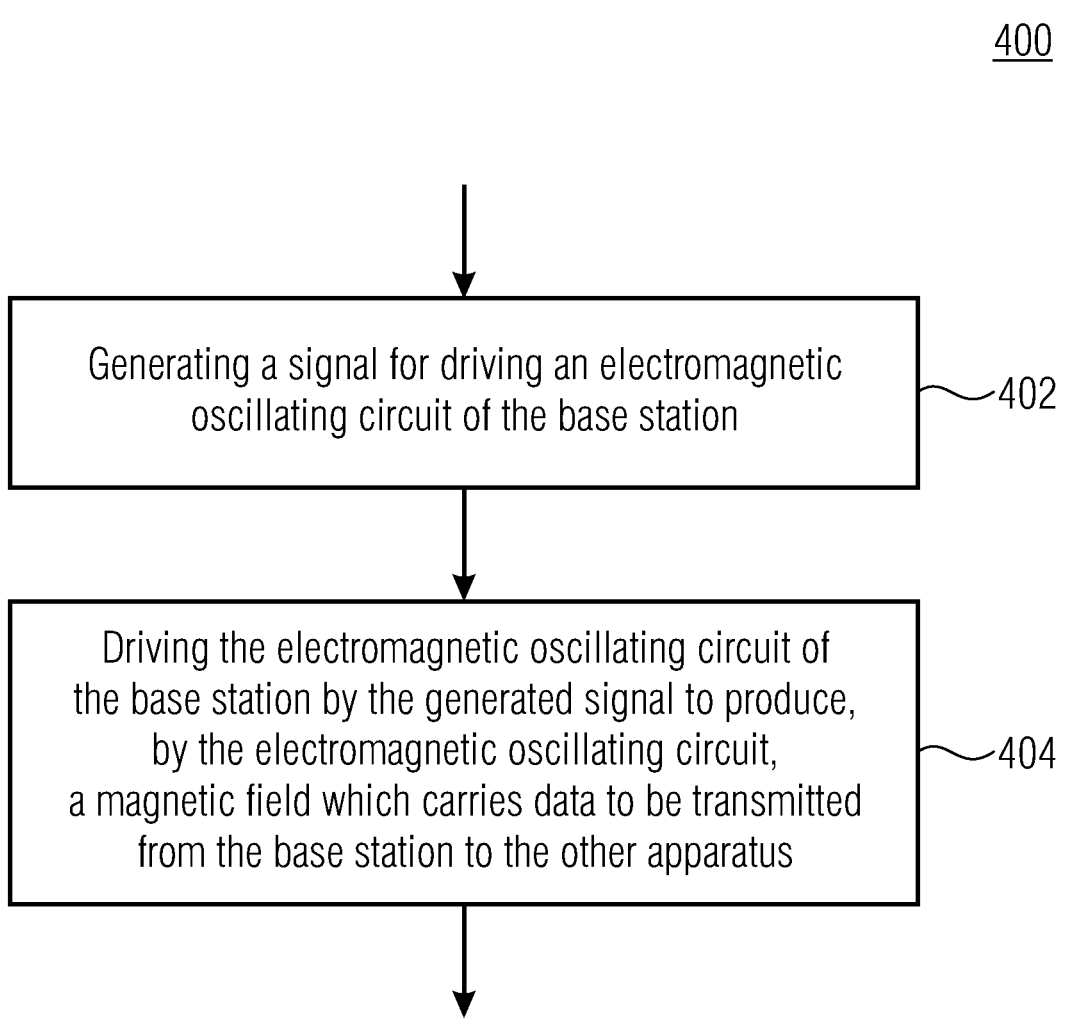
FIG. 6 is a flowchart of a method for transmitting data between a base station and another apparatus, in accordance with an embodiment.

FIG. 6 shows a flowchart of a method 400 for transmitting data between a base station and another apparatus. The method 400 comprises a step 402 of generating a signal for driving an electromagnetic oscillating circuit of the base station. Additionally, the method 400 comprises a step 404 of driving the electromagnetic oscillating circuit of the base station by the generated signal to produce, by the electromagnetic oscillating circuit, a magnetic field which carries data to be transmitted from the base station to the other apparatus.

Figure 7:
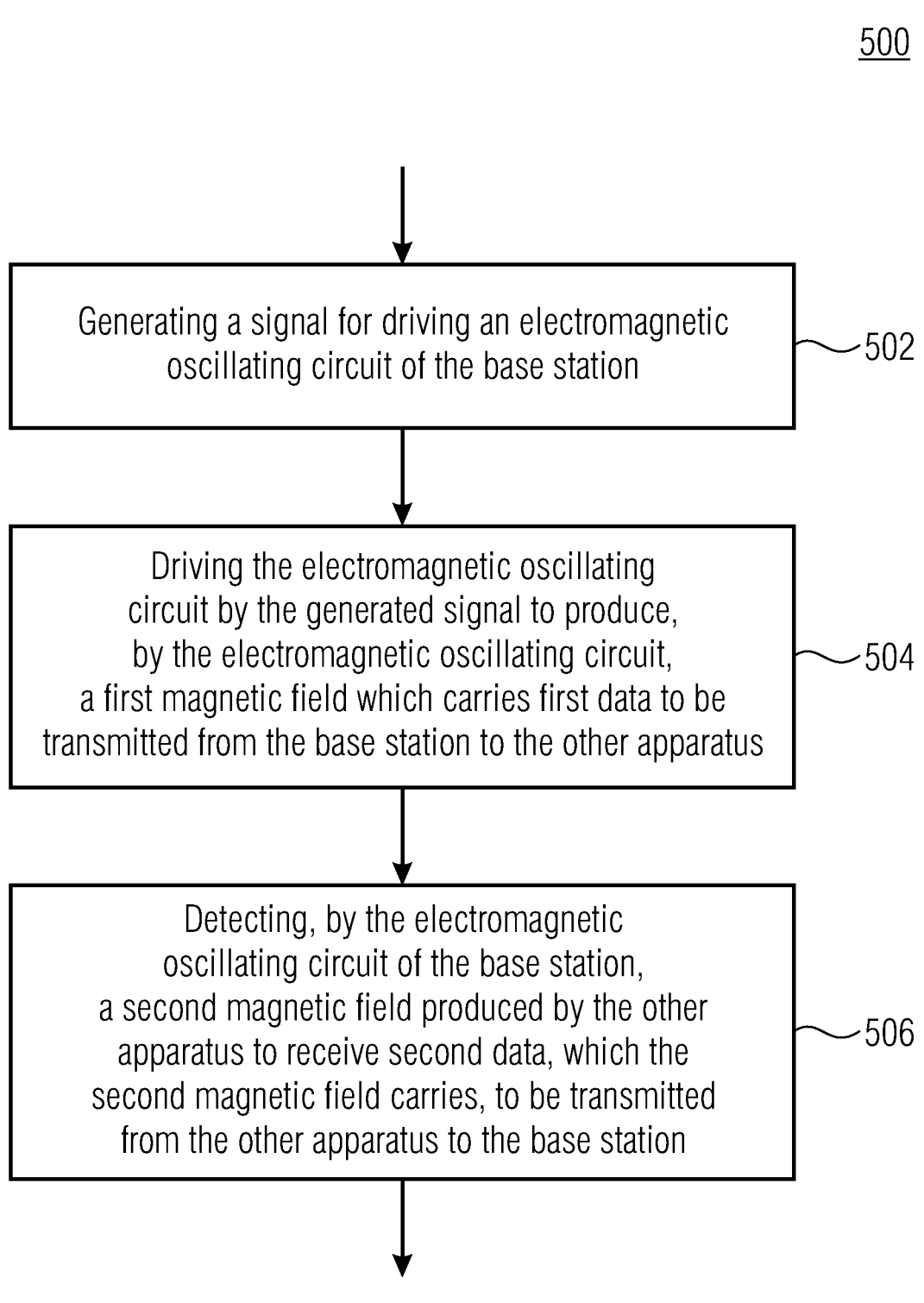
FIG. 7 is a flowchart of a method for bidirectionally transmitting data between a base station and another apparatus, in accordance with an embodiment.

FIG. 7 shows a flowchart of a method 500 for bidirectionally transmitting data between a base station and another apparatus. The method 500 comprises a step 502 of generating a signal for driving an electromagnetic oscillating circuit of the base station. Additionally, the method 500 comprises a step 504 of driving the electromagnetic oscillating circuit by the generated signal to produce, by the electromagnetic oscillating circuit, a first magnetic field which carries first data to be transmitted from the base station to the other apparatus. Additionally, the method 500 comprises a step 506 of detecting, by the electromagnetic oscillating circuit of the base station, a second magnetic field produced by the other apparatus to receive second data, which the second magnetic field carries, to be transmitted from the other apparatus to the base station.

Although some aspects have been described in the context of an apparatus, it is clear that these aspects also represent a description of the corresponding method, such that a block or device of an apparatus also corresponds to a respective method step or a feature of a method step. Analogously, aspects described in the context of or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium or the computer-readable medium are typically tangible and/or non-volatile or non-transitory.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises an apparatus or a system configured to transfer a computer program for performing one of the methods described herein to a receiver. The transmission can, for example, be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be universally applicable hardware, such as a computer processor (CPU), or hardware specific for the method, such as ASIC.

The apparatuses described herein can, for example, be implemented using a hardware apparatus, or using a computer, or using a combination of a hardware apparatus and a computer.

The apparatuses described herein, or any components of the apparatuses described herein, can be implemented, at least partly, in hardware and/or in software (computer program).

The methods described herein can, for example, be implemented using a hardware apparatus, or using a computer, or using a combination of a hardware apparatus and a computer.

The methods described herein, or any components of the methods described herein, can be executed, at least partly, by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for transmitting data between a user terminal and another apparatus, the method comprising:
   generating, with a signal generator of the user terminal, an analog audio signal in a frequency range between 10 Hz and 22 kHz for driving an electromagnetic oscillating circuit connected to the user terminal,
   driving the electromagnetic oscillating circuit by the generated analog audio signal in the frequency range between 10 Hz and 22 kHz to produce, by the electromagnetic oscillating circuit, a magnetic field which carries the data to be transmitted from the user terminal to the another apparatus;
   wherein the data are configuration data for configuring the another apparatus;
   detecting the magnetic field by an electromagnetic oscillating circuit of the another apparatus to receive the data;
   configuring the another apparatus based on the received data;
   wherein the data are first data,
   wherein the magnetic field is a first magnetic field,
   the method further comprising:
   producing a second magnetic field by the electromagnetic oscillating circuit of the another apparatus, the second magnetic field carrying second data to be transmitted from the another apparatus to the user terminal, and
   detecting the second magnetic field by the electromagnetic oscillating circuit connected to the user terminal to receive the second data.

2. The method in accordance with claim 1,
   wherein the data are modulated onto the generated audio signal.

3. The method in accordance with claim 1,
wherein the electromagnetic oscillating circuit is connected to the user terminal via an audio interface of the user terminal.

4. The method in accordance with claim 3,
wherein the audio interface is a wired audio interface.

5. The method in accordance with claim 4,
wherein the wired audio interface is a jack or an audio port.

6. The method in accordance with claim 1,
wherein the electromagnetic oscillating circuit is an LC oscillating circuit.

7. The method in accordance with claim 1,
wherein the user terminal is a mobile phone or tablet computer.

8. The method in accordance with claim 1,
wherein configuring the another apparatus comprises connecting the another apparatus to a communication network using the received data.

9. The method in accordance with claim 1,
wherein detecting and configuring are performed by the another apparatus.

10. The method in accordance with claim 1,
wherein the another apparatus is an Internet of Things (IoT) node or a wireless local area network (WLAN) camera.

11. The method in accordance with claim 10,
wherein the IoT node is a sensor node or actuator node.

12. The method in accordance with claim 1, the method further comprising:
evaluating a signal provided by the electromagnetic oscillating circuit responsive to detecting the second magnetic field to receive the second data.

13. The method in accordance with claim 12,
wherein the signal provided by the electromagnetic oscillating circuit is evaluated by the user terminal.

14. The method in accordance with claim 1,
wherein producing the second magnetic field comprises:
generating a second signal for driving the electromagnetic oscillating circuit of the another apparatus,
driving the electromagnetic oscillating circuit of the another apparatus by the generated second signal to produce the second magnetic field, which carries the second data, by the electromagnetic oscillating circuit of the another apparatus.

15. A method for bidirectionally transmitting data between a user terminal and another apparatus, the method comprising:
generating, with a signal generator of the user terminal, an analog audio signal in a frequency range between 10 Hz and 22 kHz for driving an electromagnetic oscillating circuit connected to the user terminal,
driving the electromagnetic oscillating circuit by the generated analog audio signal in the frequency range between 10 Hz and 22 kHz to produce, by the electromagnetic oscillating circuit, a first magnetic field which carries first data to be transmitted from the user terminal to the another apparatus,
detecting, by the electromagnetic oscillating circuit connected to the user terminal, a second magnetic field produced by the another apparatus to receive second data, which the second magnetic field carries, to be transmitted from the another apparatus to the user terminal,
wherein the electromagnetic oscillating circuit is connected to the user terminal via a bidirectional audio interface of the user terminal, or wherein the electromagnetic oscillating circuit is connected via a bidirectional audio interface of a wireless audio adapter connected to the user terminal.

16. The method in accordance with claim 15, the method further comprising:
evaluating a signal provided by the electromagnetic oscillating circuit responsive to detecting the second magnetic field to receive the second data.

17. The method in accordance with claim 15, the method further comprising:
detecting the first magnetic field by an electromagnetic oscillating circuit of the another apparatus to receive the first data.

18. The method in accordance with claim 15, the method further comprising:
producing the second magnetic field by the electromagnetic oscillating circuit of the another apparatus, the second magnetic field carrying the second data to be transmitted from the another apparatus to the user terminal.

19. A user terminal,
wherein the user terminal comprises an audio signal generator, wherein the user terminal is configured to drive the audio signal generator to generate an analog audio signal in a frequency range between 10 Hz and 22 kHz for driving an electromagnetic oscillating circuit, and to drive the electromagnetic oscillating circuit by the generated analog audio signal in the frequency range between 10 Hz and 22 kHz to produce, by the electromagnetic oscillating circuit, a first magnetic field which carries first data to be transmitted from the user terminal to another apparatus;
wherein the user terminal comprises an audio signal detector and wherein the user terminal is configured to detect, by the audio signal detector, a second magnetic field produced by an electromagnetic oscillating circuit of the another apparatus, and to receive second data, which the second magnetic field carries, to be transmitted from the another apparatus to the user terminal.

20. The user terminal in accordance with claim 19,
wherein the electromagnetic oscillating circuit is connected to the user terminal via an audio interface of the user terminal,
or wherein the electromagnetic oscillating circuit is connected via an audio interface of a wireless audio adapter connected to the user terminal.

21. The user terminal in accordance with claim 20,
wherein the wireless audio adapter is a Bluetooth, WLAN or Certified Wireless USB audio adapter.

22. The user terminal in accordance with claim 19,
wherein the audio interface is a wired audio interface.

23. The user terminal in accordance with claim 22,
wherein the wired audio interface is a jack or an audio port.

24. The user terminal in accordance with claim 19,
wherein the electromagnetic oscillating circuit is an LC oscillating circuit.

25. A system comprising:
the user terminal in accordance with claim 19, and
the another apparatus,
the another apparatus comprising the electromagnetic oscillating circuit configured to detect the first magnetic field which carries the first data.

26. The system in accordance with claim 25,
wherein the another apparatus comprises a microcontroller configured to evaluate the detected first magnetic field to receive the first data.

27. The system in accordance with claim 25, wherein the microcontroller of the another apparatus is configured to produce, by the electromagnetic oscillating circuit of the another apparatus, the second magnetic field which carries the second data to be transmitted from the another apparatus to the user terminal.

28. The system in accordance with claim 27, wherein the electromagnetic oscillating circuit of the another apparatus is connected directly to comparator inputs/outputs of the microcontroller of the another apparatus.

29. The system in accordance with claim 28, wherein the microcontroller of the another apparatus is configured to put the comparator inputs/outputs to a defined level to detect the first magnetic field by the electromagnetic oscillating circuit of the another apparatus.

30. The system in accordance with claim 28, wherein the microcontroller of the another apparatus is configured to generate a signal for driving the electromagnetic oscillating circuit of the another apparatus, and to drive the electromagnetic oscillating circuit of the another apparatus by the generated signal to produce the second magnetic field, which carries the second data, by the electromagnetic oscillating circuit of the another apparatus.

31. An apparatus comprising:

a microcontroller comprising a comparator, an electromagnetic oscillating circuit for detecting a first magnetic field and for producing a second magnetic field, wherein the microcontroller is configured to evaluate the first magnetic field detected by the electromagnetic oscillating circuit to receive first data which the first magnetic field carries, wherein the microcontroller is configured to generate a signal for driving the electromagnetic oscillating circuit, and to drive the electromagnetic oscillating circuit by the generated signal to produce the second magnetic field by the electromagnetic oscillating circuit, the second magnetic field carrying second data, and wherein the electromagnetic oscillating circuit is connected directly to inputs/outputs of the comparator of the microcontroller of the apparatus.

* * * * *